United States Patent [19]

Ballain

[11] 3,963,817

[45] June 15, 1976

[54] SYSTEM FOR REHYDRATION OF CURING OF SHAPED ACTIVATED GREEN CERAMIC STRUCTURES

[75] Inventor: Marlyn D. Ballain, Belleville, Ill.

[73] Assignee: Aluminum Company of America, Pittsburgh, Pa.

[22] Filed: July 11, 1974

[21] Appl. No.: 487,642

[52] U.S. Cl. .................................. 264/56; 264/232
[51] Int. Cl. ............................................. C04b 35/10
[58] Field of Search ............. 264/4, 150, 232, 234, 264/63, 56, 134

[56] References Cited
UNITED STATES PATENTS 2,978,782   4/1961   Wagner.............................. 264/56

Primary Examiner—Donald J. Arnold
Assistant Examiner—John Parrish
Attorney, Agent, or Firm—John P. Taylor

[57] ABSTRACT

A system for rehydration of green ceramic structures, particularly thin-walled extrusions, comprising immersing the structure into a fluid bath maintained at a temperature of 50°–100°C. The green ceramic structure is rehydrated using the moisture in the green ceramic structure. The liquid acts as a support, a temperature control, and a means for preventing moisture escape and premature drying of the ceramic during rehydration.

4 Claims, 1 Drawing Figure

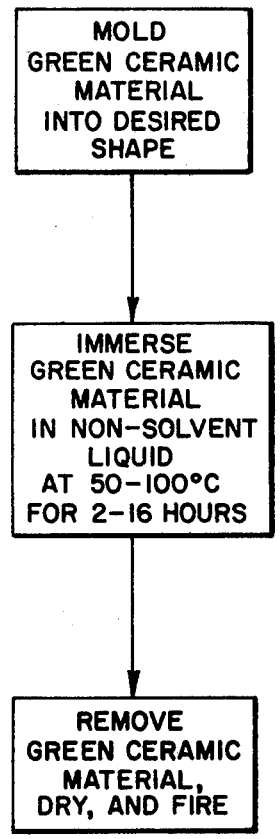

SYSTEM FOR REHYDRATION OF CURING OF SHAPED ACTIVATED GREEN CERAMIC STRUCTURES

CROSS-REFERENCE TO RELATED APPLICATIONS

This application is related to U.S. Application Ser. No. 487643, entitled "High Strength Alumina-Silica Catalyst Substrates Having High Surface Area", filed concurrently in the names of Marlyn D. Ballain and Leroy D. Hart.

BACKGROUND OF THE INVENTION

This invention relates to rehydration of activated green ceramic. More particularly, it relates to the rehydration of green ceramics which have been molded into shaped structures, such as by extrusion, into thin-wall shapes.

In the preparation of activated ceramics for catalyst supports or the like, it is customary to first activate, or dehydrate, the ceramic and then to rehydrate the ceramic prior to subsequent reactivation and firing. The initially activated ceramic may, at times, prior to rehydration be formed into a slip or doughy-like substance by the addition of small amounts of water, and optionally plasticizers thereto, followed by molding or extrusion of the green ceramic into a particular shape. When such a shape comprises a thin-walled object it has been found to be difficult to control the rehydration of the green ceramic without incurring cracking or the like which is believed to be due to a premature drying out of the wall.

It is therefore an object of this invention to provide a system for the rehydration of molded green ceramics to inhibit or prevent the previous deleterious effects as discussed above. It is a particular object of the invention to provide a system for rehydration of green ceramic which has been extruded into a thin-wall green ceramic structure.

SUMMARY OF THE INVENTION

In accordance with the invention, a previously activated green ceramic is mixed with water and other additives such as plasticizers, shaped into a desired green ceramic structure such as by being extruded into a thin-wall structure, and then placed in a liquid which is not a solvent for any ingredients in the green ceramic structure. The liquid is maintained at a temperature of 50°–100°C and the green ceramic is kept therein for a period of from 2 to 16 hours to permit the water already within the green ceramic structure to recombine with the ceramic to form a hydrated structure.

BRIEF DESCRIPTION OF THE DRAWING

The sole drawing of the invention is a flow sheet illustrating the system.

DESCRIPTION OF THE PREFERRED EMBODIMENTS

In accordance with the invention, a green ceramic or refractory which has been previously molded into a desired shape such as by extrusion into a thin-wall shape is rehydrated in a fluid bath at a temperature of 50°–100°C for a period of from about 2 to 16 hours to provide a controlled rehydration of the green ceramic.

The term "green ceramic" is intended to define an activated or dehydrated ceramic such as, for example, alumina, silica, magnesia, or zirconia, as well as mixtures thereof.

The term "green ceramic material" as used herein is intended to define the dehydrated ceramic mixed with water into a paste of desired viscosity and, if desired, further mixed with a plasticizer. Examples of plasticizers which may be useful in this invention include those which are named in the concurrently filed copending application cross-referenced above.

The term "green ceramic structure" as used herein is intended to include the green ceramic material shaped into the desired physical form.

The term "thin wall extrusion", in contrast to a pellet, is defined as an extrusion having an average wall thickness of 0.159 cm or less. However, it should be understood that while the invention described and claimed herein has been found to be particularly effective in solving problems associated with rehydration of such thin-wall shapes, it is not intended that the scope of the invention be limited to only use on such thin-wall structures.

As stated above, the green ceramic is mixed with water and other additives such as plasticizers and then molded into the desired final structure such, for example, by being extruded into a thin-wall shape. The green ceramic structure is then placed, while in this green, unrehydrated state, in a bath containing a liquid at a temperature of from 50°–100°C.

The liquid in the fluid bath in which the green ceramic structure is immersed during rehydration must not be a solvent for the green ceramic material. That is, it must not be capable of dissolving any of the ingredients in the green ceramic material. The liquid also should not be miscible with water and therefore is, preferably, a non-polar liquid. Non-polar organic liquids which neither act as solvents for any of the ingredients of the ceramic material nor are miscible with water are preferred. One class of such liquids which has been found to be particularly effective are saturated alkanes having the formula $C_nH_{2n+2}$ wherein $n$ is an integer from 6 to 20 which are liquids at room temperature such as, for example, hexane, octane, decane or petroleum fractions normally containing mixtures of such liquids such as, for example, kerosene or fuel oil, gas oils, and lubricating or mineral oils.

Furthermore, the viscosity or specific gravity of the liquid is chosen to be such that the green ceramic structure will not float to the surface of the liquid. While the exact mechanism by which the invention operates is not completely understood, nor do I wish to be bound by any theories, it appears that the liquid acts to encapsulate the moisture already present in the green ceramic material and further to act as a temperature control as well as a physical support for the structure during the time it is rehydrating. Thus, if the green ceramic structure floats to the surface of the liquid, a portion of the structure may be exposed to air resulting in premature drying of the exposed portion which can result in cracking or shrinkage of at least that portion of the ceramic structure during the rehydration.

As stated above, the structure is maintained in the liquid for a period of from 2 to 16 hours at a temperature of from 50°–100°C. The longer period of time may be necessary when using the lower temperatures, in contrast to shorter periods of time necessary when working at more elevated temperatures within the specified range.

The following examples will further serve to illustrate the practice of the invention.

EXAMPLE I 280 grams of activated alumina ground to a particle size of 10 micrometers (microns) were blended with 70 grams of colloidal silica (cab-o-sil). The blended product was then mixed with a plasticizer mix comprising 110 grams of water, 110 grams of colloidal silica suspension (Syton-FM) and 2.2 grams of a water soluble coagulant plasticizer (POLY-OXCOAGULANT).

The mix was then extruded through a monolith extrusion die shaped to provide a structure of honeycomb cross section having an average wall thickness of 0.381 mm.

This extrusion was placed in an oil bath comprising 10 wt. lubricating oil at 50°C for 16 hours. The rehydrated structure was then removed from the bath, dried in an oven at 110°C and fired at a temperature of 1400°C. The resultant structure was free of cracking.

EXAMPLE II

A second green structure prepared identically to that used in Example I was placed in a container containing water vapor at 100% relative humidity and at a temperature of 50°C. The extrusion was kept therein for 16 hours after which it was removed and examined. It was noted that severe cracking and shrinking had occurred during the rehydration or curing.

EXAMPLE III

Another series of extrusions prepared in accordance with that outlined in Example I were immersed in kerosene oil baths respectively at temperatures of 25°C, 70°C, and 80°C. The 80°C structure was removed after 3 hours and examined and found to be free of either cracking or shrinkage. The structures in the 25° and 70° baths were removed after 16 hours. The structure which had been rehydrated in the 70° bath was found to be satisfactory while that of the 25° bath was found to have failed with the structure cracking upon subsequent drying at 110°C.

EXAMPLE IV

To further illustrate the need for a liquid which is not a solvent for any of the materials, an isostearic acid bath was prepared at 70°C. An extrusion similar to that described in Example I was immersed therein for 2 hours. Upon removal of the extrusion, it was found that the bath media had reacted with the constituents of the extrusion.

What is claimed is:

1. A system for rehydration of an activated green ceramic material capable of preventing cracking or premature drying of green ceramic material which has been previously extruded into a thin-wall structure comprising immersing the green ceramic material into a fluid bath maintained at a temperature of 50°–100°C comprising a liquid wherein the specific gravity of the liquid is less than that of said green ceramic material so as to allow immersion of said green ceramic material in said liquid and further such that said material will not rise above the surface of said liquid and which is not a solvent for any ingredients in said green ceramic material for a period of from 2–16 hours to thereby permit controlled rehydration of the green ceramic without injury to the structure thereof.

2. The system of claim 1 wherein said liquid is a non-polar organic liquid.

3. The system of claim 1 wherein said liquid comprises one or more hydrocarbons having the formula $C_nH_{2n+2}$ wherein n is a whole integer from 6–20.

4. A system for rehydrating activated green ceramic material previously extruded into a thin-wall structure comprising immersing said structure into a liquid bath at a temperature of 50°–100°C for a period of from 2–16 hours to thereby permit controlled rehydration of the green ceramic without damage to the structure thereof, said liquid in said bath being further characterized as: (a) a non-polar organic liquid; (b) not miscible with water; (c) not a solvent for any ingredients in said green ceramic material; and (d) having a specific gravity less than said green ceramic material.

* * * * *